(12) United States Patent
Foguenne

(10) Patent No.: US 6,589,897 B1
(45) Date of Patent: Jul. 8, 2003

(54) GREEN SODA GLASS

(75) Inventor: Marc Foguenne, Saint-Denis (BE)

(73) Assignee: Glaverbel, Brussels (BE)

( * ) Notice: Subject to any disclaimer, the term of this patent is extended or adjusted under 35 U.S.C. 154(b) by 0 days.

(21) Appl. No.: 09/719,519

(22) PCT Filed: Jun. 25, 1999

(86) PCT No.: PCT/BE99/00083
§ 371 (c)(1),
(2), (4) Date: Mar. 6, 2001

(87) PCT Pub. No.: WO00/01633
PCT Pub. Date: Jan. 13, 2000

(30) Foreign Application Priority Data

Jun. 30, 1998 (BE) .............................. 9800493

(51) Int. Cl.$^7$ ........................ C03C 3/087; C03C 3/085
(52) U.S. Cl. ........................................ 501/71; 501/70
(58) Field of Search .............................. 501/64, 70, 71

(56) References Cited

U.S. PATENT DOCUMENTS

| | | | | | |
|---|---|---|---|---|---|
| 5,087,525 | A | * | 2/1992 | Goodman et al. | 428/216 |
| 5,106,653 | A | * | 4/1992 | Platts | 427/110 |
| 5,776,845 | A | * | 7/1998 | Boulos et al. | 501/64 |
| 5,780,372 | A | * | 7/1998 | Higby | 501/70 |
| 5,830,812 | A | * | 11/1998 | Shelestak et al. | 501/70 |
| 6,313,053 | B1 | * | 11/2001 | Shelestak | 501/71 |
| 6,335,299 | B1 | * | 1/2002 | Foguenne et al. | 501/70 |

* cited by examiner

Primary Examiner—David Sample
Assistant Examiner—Elizabeth A Bolden
(74) Attorney, Agent, or Firm—Piper Rudnick LLP; Jerold I. Schneider

(57) ABSTRACT

The invention concerns a colored soda glass of green shade comprising at most 0.27 wt. % of FeO and has under a standard illuminant A and for a thickness of 4 mm, a light transmission (TLA-4) less then 70%, a selectivity (SE4) higher than 1.50 and an ultraviolet radiation transmission (TUV4) less than 20%. Said glass is particularly suited for vehicle side glazing and rear windows.

15 Claims, No Drawings

GREEN SODA GLASS

CROSS REFERENCE TO RELATED APPLICATIONS

This application is based upon, and claims priority from International Application No., PCT/BE99/00083 filed Jun. 25, 1999, and Belgian Application No. 9800493 filed Jun. 30, 1998, both of which are hereby incorporated by reference.

BACKGROUND OF THE INVENTION

The present invention relates to a green-colored soda-lime glass composed of the principal constituents—glass formers—and of coloring agents.

The expression "soda-lime glass" is used here in a wide sense and relates to any glass which contains the following constituents (in percentages by weight):

| | |
|---|---|
| $Na_2O$ | 10 to 20% |
| CaO | 0 to 16% |
| $SiO_2$ | 60 to 75% |
| $K_2O$ | 0 to 10% |
| MgO | 0 to 10% |
| $Al_2O_3$ | 0 to 5% |
| BaO | 0 to 2% |
| BaO + CaO + MgO | 10 to 20% |
| $K_2O + Na_2O$ | 10 to 20%. |

This type of glass is widely used in the field of glazing for buildings or automobiles, for example. It is usually manufactured in the form of a ribbon by the drawing or float process. Such a ribbon can be cut into sheets which can then be bent or can undergo a treatment to improve the mechanical properties, for example a thermal toughening step.

When referring to the optical properties of a glass sheet, it is generally necessary to relate these properties to a standard illuminant. In the present description, 2 standard illuminants are used, namely illuminant C and illuminant A defined by the Commission Internationale de l'Eclairage (C.I.E.). Illuminant C represents average daylight having a color temperature of 6700 K. This illuminant is especially useful for evaluating the optical properties of glazing intended for buildings. Illuminant A represents the radiation of a Planck radiator with a temperature of about 2856 K. This illuminant represents the light emitted by car headlights and is essentially intended to evaluate the optical properties of windows intended for automobiles. The Commission Internationale de l'Eclairage has also published a document entitled "Colorimétrie, Recommandations Officielles de la C.I.E. [*Colorimetry and Official Recommendations of the C.I.E.*"] (May 1970) which describes a theory in which the calorimetric coordinates for light of each wavelength of the visible spectrum are defined so as to be able to be represented on a diagram having orthogonal axes x and y, called the C.I.E. trichromatic diagram. This trichromatic diagram shows the location representative of light of each wavelength (expressed in nanometers) of the visible spectrum. This location is called the "spectrum locus" and light whose coordinates are situated on this spectrum locus is said to have 100% excitation purity for the appropriate wavelength. The spectrum locus is closed by a line called the purple boundary which connects the points of the spectrum locus whose coordinates correspond to wavelengths of 380 nm (violet) and 780 nm (red). The area lying between the spectrum locus and the purple boundary is that available for the trichromatic coordinates of any visible light. The coordinates of the light emitted by illuminant C, for example, correspond to x=0.3101 and y=0.3162. This point C is regarded as representing white light and consequently has an excitation purity equal to zero for any wavelength. Lines may be drawn from the point C to the spectrum locus at any desired wavelength and any point lying on these lines may be defined not only by its x and y coordinates but also as a function of the wavelength corresponding to the line on which it lies and on its distance from the point C relative to the total length of the wavelength line. Consequently, the tint of the light transmitted by a colored glass sheet may be described by its dominant wavelength and its excitation purity expressed as a percentage.

In fact, the C.I.E. coordinates of light transmitted by a colored glass sheet will depend not only on the composition of the glass but also on its thickness. In the present description, and in the claims, all the values of the excitation purity P, of the dominant wavelength $\lambda_D$ of the transmitted light and of the light transmission factor of the glass (TLC5) are calculated from the specific internal spectral transmissions ($TSI_\lambda$) of a glass sheet 5 mm in thickness. The specific internal spectral transmission of a glass sheet is governed solely by the absorption of the glass and can be expressed by the Beer-Lambert law:

$$TSI_\lambda = e^{-E \cdot A_\lambda}$$

where $A_\lambda$ is the absorption coefficient (in $cm^{-1}$) of the glass at the wavelength in question and E is the thickness (in cm) of the glass. To a first to a first approximation, $TSI_\lambda$ may also be represented by the formula:

$$(I_3 + R_2)/(I_1 - R_1)$$

where $I_1$ is the intensity of the visible light incident on a first face of the glass sheet, $R_1$ is the intensity of the visible light reflected by this face, $I_3$ is the intensity of the visible light transmitted from the second face of the glass sheet and $R_2$ is the intensity of the visible light reflected by this second face toward the interior of the sheet.

In the description which follows and in the claims, the following are also used:

the total light transmission for illuminant A (TLA) measured for a thickness of 4 mm (TLA4). This total transmission is the result of the integration between the 380 and 780 nm wavelengths of the expression: $\Sigma T_\lambda \cdot E_\lambda \cdot S_\lambda / \Sigma E_\lambda \cdot S_\lambda$ in which $T_\lambda$ is the transmission at the wavelength $\lambda$, $E_\lambda$ is the spectral distribution of illuminant A and $S_\lambda$ is the sensitivity of the normal human eye as a function of the wavelength $\lambda$;

the total energy transmission (TE) measured for a thickness of 4 mm (TE4). This total transmission is the result of the integration between the 300 and 2150 nm wavelengths of the expression $\Sigma T_\lambda \cdot E_\lambda / \Sigma E_\lambda$ in which $E_\lambda$ is the spectral energy distribution of the sun at 30° above the horizon;

the selectivity (SE) measured as the ratio of the total light transmission for illuminant A to the total energy transmission (TLA/TE);

the total transmission in the ultraviolet, measured for a thickness of 4 mm (TUV4). This total transmission is the result of the integration between 280 and 380 nm of the expression: $\Sigma T_\lambda \cdot U_\lambda / \Sigma U_\lambda$, in which $U_\lambda$ is the spectral distribution of the ultraviolet radiation that has passed through the atmosphere, defined in the DIN 67507 standard.

SUMMARY OF THE INVENTION

The present invention relates in particular to green glasses. Green glasses are generally chosen for their protective properties with respect to solar radiation and their use in buildings is known. Green glasses are used in architecture and for partially glazing certain vehicles or railroad compartments.

The present invention relates to a highly selective green glass which is especially appropriate for use in the form of car windows and in particular as front and rear side windows and as rear window. This is because it is important in the automobile field for the windows of vehicles to provide sufficient light transmission while having an energy transmission as low as possible so as to prevent any overheating of the passenger space in sunny weather.

Glasses with a high selectivity generally demand a high absorption of infrared radiation, which makes them difficult to manufacture in conventional glass furnaces.

The invention provides a green-colored soda-lime glass composed of principal glass-forming constituents and coloring agents, characterized in that it contains no more than 0.27% by weight of FeO and has, under illuminant A and for a glass thickness of 4 mm, a light transmission (TLA4) of between 40 and 70%, a selectivity (SE4) of greater than or equal to 1.50 and an ultraviolet radiation transmission (TUV4) of less than 20%.

The combination of these optical properties is particularly advantageous in that it offers, while ensuring a good light transmission through the glass, a high selectivity value and a low transmission value in the ultraviolet. This makes it possible both to avoid internal heating of the volumes bounded by windows according to the invention and the esthetically unattractive discoloration of objects placed inside these volumes, due to the effect of the ultraviolet solar radiation.

Preferably, the glass according to the invention has a selectivity (SE4) of greater than or equal to 1.55, even more preferably greater than 1.6. Such selectivity values make it possible to optimize the effectiveness of the thermal filtering of a window for a given light transmission and consequently to improve the comfort within glazed spaces by limiting the extent to which they become overheated when exposed to strong sunlight.

It is remarkable that this result is obtained when the glass has a low upper limit of the FeO content by weight. This value of the FeO content means that the glass can be produced by means of a conventional furnace, which may be of large capacity. The use of such a furnace is economic compared with that of small electric furnaces which normally have to be used for the manufacture of highly selective glasses. Indeed in such cases the high FeO contents make it difficult to melt, sometimes requiring the use of small-capacity electric furnaces.

Iron is in fact present in most commercially available glasses either as an impurity or introduced deliberately as a coloring agent. The presence of $Fe^{3+}$ gives the glass a slight absorption of visible light of short wavelength (410 and 440 nm) and a very strong absorption band in the ultraviolet (absorption band centered on 380 nm), whereas the presence of $Fe^{2+}$ ions causes a strong absorption in the infrared (absorption band centered on 1050 nm). The ferric ions give the glass a slight yellow coloration, whereas the ferrous ions give a more pronounced blue-green coloration. All other considerations being equal, it is the $Fe^{2+}$ ions which are responsible for the absorption in the infrared range and which therefore determine the TE. The TE value decreases, thereby increasing the SE value, as the $Fe^{2+}$ concentration increases. By favoring the presence of $Fe^{2+}$ ions over $Fe^{3+}$ ions, a high selectivity is thus obtained.

Preferably, the glass according to the invention provides a TL of greater than 50%, even more preferably greater than 55%. Consequently, the glass has a light transmission that easily satisfies the lower limits recommended for safety reasons at the rear of vehicles.

Advantageously, the dominant wavelength of the glass according to the invention is less than 550 nm and preferably less than 520 nm. Green glasses with a shade meeting these upper limits are regarded as being attractive.

Preferably, a colored glass according to the invention contains no more than three coloring agents. This is advantageous in terms of the ease of controlling the properties of the batch of components to be melted in order to produce the glass compared with compositions containing a larger number of coloring agents, the homogeneity of which is more difficult to maintain.

Preferably, the glass according to the invention contains, as coloring agent, in addition to iron, at least one of the elements chromium, cobalt and vanadium. The addition of very small amounts of these elements makes it possible to adjust the optical properties of the glass in an optimum fashion and, especially, to obtain a highly selective glass.

It is possible to produce a glass having roughly a color similar to that of the glass according to the invention using, in particular, nickel as coloring agent. However, the presence of nickel has drawbacks, especially when the glass must be produced by the float process. In the float process, a ribbon of hot glass is conveyed along the surface of a bath of molten tin so that its faces are plane and parallel. In order to prevent oxidation of the tin on the surface of the bath, which would lead to tin oxide being entrained by the ribbon, a reducing atmosphere is maintained above the bath. When the glass contains nickel, this is partially reduced by the atmosphere above the tin bath, giving rise to a haze in the glass produced. This element is also unpropitious to obtaining a high selectivity value of the glass which contains it, since it does not absorb light in the infrared range, resulting in a high TE value. In addition, nickel present in the glass can form the sulfide NiS. This sulfide exists in various crystalline forms which are stable in different temperature ranges, and the transformations of which, from one form to another, create problems when the glass has to be reinforced by a thermal toughening treatment, as is the case in the automobile field and also in the case of certain glazing products for buildings (balconies, spandrels, etc.). The glass according to the invention, which contains no nickel, is therefore particularly well suited to being manufactured by the float process and to architectural use or in the field of motor vehicles or the like.

The effects of the various coloring agents individually considered for producing a glass are the following (according to "Le Verre [Glass]" by H. Scholze, translated by J. Le Dû, Institut du Verre [Glass Institute], Paris):

cobalt: the Cobalt: the $Co^{II}O_4$ group produces an intense blue coloration;

chromium: the presence of the $Cr^{III}O_6$ group gives rise to absorption bands at 650 nm and gives a light green color. More extensive oxidation gives rise to the $Cr^{VI}O_4$ group which creates a very intense absorption band at 365 nm and gives a yellow coloration;

vanadium: for increasing contents of alkali metal oxides, the color changes from green to colorless, this being caused by the oxidation of the $V^{III}O_6$ group into $V^{V}O_4$.

The energy and optical properties of a glass containing several coloring agents are therefore the result of a complex interaction between them. Indeed, the behavior of these coloring agents depends greatly on their redox state and therefore on the presence of other elements liable to influence this state.

DETAILED DESCRIPTION OF THE PREFERRED EMBODIMENTS

In preferred embodiments, the glass according to the invention has optical properties which lie within the ranges defined below:

55%<TLA4<70%
30%<TE4<45%
6%<TUV4<20%
490 nm<$\lambda_D$<520 nm
2%<P<10%.

The light transmission range thus defined makes the glass according to the invention particularly useful for reducing the dazzling effect produced by the light from automobile headlights when it is used for the rear side windows or as the rear windows of vehicles. The corresponding energy transmission range provides the glass with its high selectivity. In the form of front side windows for vehicles, the glass according to the invention must have a TL of greater than or equal to 70%. It is therefore used with a thickness of 3 mm so as to meet this requirement. As regards the dominant-wavelength and excitation-purity ranges, these correspond to shades and to an intensity of color which are found to be particularly attractive, especially according to present-day tastes in the architectural and automotive fields.

These properties are obtained from the following percentages by weight of coloring agents, the total amount of iron being expressed in the form of $Fe_2O_3$:

| | |
|---|---|
| $Fe_2O_3$ | 0.7 to 1.3% |
| CaO | 0.18 to 0.27% |
| Co | 0 to 0.0040% |
| $V_2O_5$ | 0.0050 to 0.1%. |

The use of vanadium as coloring agent has the advantage of limiting the production costs of the glass according to the invention because of the inexpensive nature of this element. Moreover, vanadium is also beneficial in environmental protection terms, due to its less polluting character, and in obtaining the low ultraviolet radiation transmission value of the glass according to the invention. Vanadium also has a high absorption in the infrared radiation range, which helps in obtaining a glass having a low energy transmission and a high selectivity.

It is also possible to obtain the same ranges of optical properties from the presence in the glass of the following percentages by weight of coloring agents:

| | |
|---|---|
| $Fe_2O_3$ | 0.7 to 1.3% (total iron) |
| FeO | 0.18 to 0.27% |
| Co | 0 to 0.0040% |
| $Cr_2O_3$ | 0.0015 to 0.0250%. |

The combination of these coloring agents, and in particular the use of chromium, is not unfavorable for preserving the refractory walls of the furnace for manufacturing the glass, there being no risk of corrosion of the said walls by them.

According to certain especially preferred embodiments, the glass according to the invention has optical properties lying within the following ranges:

63%<TLA4<67%
37%<TE4<41%
11%<TUV4<18%
500 nm<$\lambda_D$<505 nm
4%<P<6%.

Glass having optical properties lying within the more restricted ranges defined above is particularly efficient since it combines ideal light and energy-transmission properties for use as the rear side windows and the rear window of a vehicle. In a thickness of 3 mm, it can also be used as a front side window of a vehicle. In its architectural use, it combines its esthetic qualities with a considerable energy saving due to less stress on the air conditioning systems.

Such properties are obtained from the following percentages by weight of coloring agents, the total amount of iron being expressed in the form of $Fe_2O_3$:

| | |
|---|---|
| $Fe_2O_3$ | 0.88 to 0.98% |
| FeO | 0.22 to 0.25% |
| Co | 0.0003 to 0.0009% |
| $V_2O_5$ | 0.0200 to 0.0400%. |

It is also possible to obtain the same ranges of optical properties from the presence in the glass of the following percentages by weight of coloring agents:

| | |
|---|---|
| $Fe_2O_3$ | 0.88 to 0.98% |
| FeO | 0.22 to 0.25% |
| Co | 0.0003 to 0.0011% |
| $Cr_2O_3$ | 0.0020 to 0.0100%. |

Preferably, the glass according to the invention has a percentage by weight of FeO of less than 0.25. This makes it particularly easy to melt in a conventional glass furnace, compared with glasses which have substantially higher FeO contents.

The glass according to the invention is preferably used in the form of sheets having a thickness of 3 or 4 mm for the rear side panes and the rear windows of vehicles and thicknesses of more than 4 mm in buildings.

The glass according to the invention also preferably has a total light transmission under illuminant C, for a thickness of 5 mm (TLC5) of between 50 and 70%, which makes it favourable to eliminating the dazzling effect of sunlight when it is used in buildings.

The glass according to the invention may be coated with a layer of metal oxides which reduce its heating by solar radiation and consequently that of the space compartment of a vehicle using such a glass as glazing.

The glasses according to the present invention may be manufactured by conventional processes. In terms of batch materials, it is possible to use natural materials, recycled glass, scoria or a combination of these materials. The colorants are not necessarily added in the form indicated, but this manner of giving the amounts of coloring agents added, in equivalents in the forms indicated, corresponds to standard practice. In practice, the iron is added in the form of red iron oxide, the cobalt is added in the form of hydrated sulfate, such as $CoSO_4.7H_2O$ or $CoSO_4.6H_2O$, and the chromium is added in the form of dichromate, such as $K_2Cr_2O_7$. As regards vanadium, this is introduced in the form of oxide or sodium vanadate.

Other elements are sometimes present as impurities in the batch materials used for manufacturing the glass according to the invention (for example, manganese oxide in proportions of about 100 to 300 ppm), whether in the natural materials, in the recycled glass or in the scoria, but when the presence of these impurities does not give to the glass properties lying outside the limits defined above, these glasses are regarded as being in accordance with the present invention.

The present invention will be illustrated by the following specific examples of optical properties and compositions.

EXAMPLES 1 TO 74

Table I gives, by way of indication, the base composition of the glass and the constituents of the glass batch to be melted in order to produce the glasses according to the invention. The glass batch may, if necessary, contain a reducing agent such as coke, graphite or slag, or an oxidizing agent such as a nitrate. In this case, the proportions of the other materials are modified so that the composition of the glass remains unchanged.

Tables IIa and IIb give the optical properties and the proportions by weight of the coloring agents of a glass containing respectively either vanadium or chromium among its coloring agents. These proportions are determined by X-ray fluorescence of the glass and are converted into the molecular species indicated.

TABLE I

| | Composition of the base glass | | Constituents of the base glass | |
|---|---|---|---|---|
| $SiO_2$ | 71.5 to 71.9% | | Sand | 571.3 |
| $Al_2O_3$ | 0.8% | | Feldspar | 29.6 |
| CaO | 8.8% | | Lime | 35.7 |
| MgO | 4.2% | | Dolomite | 167.7 |
| $Na_2O$ | 14.1% | | $Na_2CO_3$ | 188.6 |
| $K_2O$ | 0.1% | | Sulfate | 6.1 |
| $SO_3$ | 0.1 to 0.5% | | | |

TABLE IIa

| Example | 1 | 2 | 3 | 4 | 5 | 6 | 7 | 8 | 9 | 10 |
|---|---|---|---|---|---|---|---|---|---|---|
| $Fe_2O_3$ (%) | 0.79 | 0.80 | 0.78 | 0.86 | 0.87 | 0.87 | 0.93 | 0.93 | 0.94 | 0.79 |
| FeO (%) | 0.20 | 0.19 | 0.19 | 0.23 | 0.21 | 0.22 | 0.24 | 0.23 | 0.23 | 0.22 |
| Co (ppm) | 9 | 9 | 12 | 16 | 13 | 15 | 15 | 13 | 12 | 4 |
| $V_2O_5$ (ppm) | 169 | 322 | 348 | 124 | 277 | 473 | 121 | 283 | 382 | 81 |
| TLA4 (%) | 68.20 | 67.75 | 67.32 | 63.87 | 64.25 | 63.35 | 62.46 | 62.60 | 61.99 | 69.18 |
| TE4 (%) | 44.30 | 44.80 | 44.20 | 40.2 | 41.4 | 40.6 | 38.7 | 39.4 | 39 | 42.9 |
| $\lambda_D$ * (nm) | 494.0 | 496.4 | 497.3 | 492.1 | 495.0 | 495.0 | 493.1 | 496.2 | 496.8 | 495.4 |
| P * (%) | 6.49 | 5.64 | 5.55 | 8.41 | 6.82 | 7.05 | 8.18 | 6.68 | 6.64 | 6.2 |
| TUV4 (%) | 17.90 | 15.80 | 15.20 | 16.1 | 13.9 | 13.5 | 14.1 | 12.3 | 11.8 | 18.8 |
| SE | 1.5 | 1.5 | 1.5 | 1.6 | 1.6 | 1.6 | 1.6 | 1.6 | 1.6 | 1.6 |
| Example | 11 | 12 | 13 | 14 | 15 | 16 | 17 | 18 | 19 | 20 |
| $Fe_2O_3$ (%) | 0.80 | 0.80 | 0.79 | 0.79 | 0.80 | 0.94 | 0.97 | 0.97 | 0.85 | 0.84 |
| FeO (%) | 0.20 | 0.20 | 0.22 | 0.20 | 0.20 | 0.24 | 0.24 | 0.24 | 0.20 | 0.21 |
| Co (ppm) | 4 | 4 | 15 | 15 | 12 | 4 | 4 | 4 | 4 | 4 |
| $V_2O_5$ (ppm) | 279 | 377 | 105 | 365 | 360 | 76 | 268 | 401 | 106 | 333 |
| TLA4 (%) | 68.94 | 68.49 | 65.14 | 64.96 | 65.23 | 65.72 | 65.00 | 64.12 | 68.80 | 67.43 |
| TE4 (%) | 43.9 | 43.6 | 41.7 | 42.5 | 43.1 | 39.7 | 39.5 | 38.8 | 43.8 | 42.8 |
| $\lambda_D$ * (nm) | 499.5 | 500.6 | 491.4 | 492.9 | 494.6 | 498.2 | 502.9 | 503.5 | 498.3 | 499.4 |
| P * (%) | 4.92 | 4.8 | 8.54 | 7.64 | 6.7 | 5.83 | 4.91 | 4.93 | 5.08 | 5.12 |
| TUV4 (%) | 16.2 | 15.6 | 18.1 | 16.4 | 15 | 13.9 | 11.8 | 11.1 | 16 | 14.6 |
| SE | 1.6 | 1.6 | 1.6 | 1.5 | 1.5 | 1.7 | 1.6 | 1.7 | 1.6 | 1.6 |
| Example | 21 | 22 | 23 | 24 | 25 | 26 | 27 | 28 | 29 | 30 |
| $Fe_2O_3$ (%) | 0.84 | 0.85 | 0.85 | 0.85 | 0.84 | 0.85 | 0.86 | 0.86 | 0.88 | 0.86 |
| FeO (%) | 0.19 | 0.21 | 0.19 | 0.21 | 0.22 | 0.21 | 0.22 | 0.21 | 0.20 | 0.22 |
| Co (ppm) | 4 | 8 | 8 | 9 | 5 | 4 | 4 | 21 | 42 | 23 |
| $V_2O_5$ (ppm) | 510 | 92 | 390 | 532 | 89 | 290 | 439 | 188 | 183 | 270 |
| TLA4 (%) | 68.22 | 67.19 | 67.20 | 65.85 | 67.81 | 67.71 | 66.61 | 62.72 | 57.44 | 62.25 |
| TE4 (%) | 44.1 | 42.5 | 43.9 | 41.9 | 41.6 | 42.8 | 41.7 | 40.8 | 39.5 | 40.2 |
| $\lambda_D$ * (nm) | 504.4 | 496.0 | 500.9 | 499.3 | 496.8 | 501.6 | 502.5 | 492.9 | 488.5 | 493.0 |
| P * (%) | 4.11 | 6.05 | 4.56 | 5.35 | 5.93 | 4.65 | 4.73 | 7.93 | 11.62 | 8.15 |
| TUV4 (%) | 13.4 | 15.9 | 13.6 | 13.5 | 16.4 | 14 | 13.1 | 14.2 | 13.4 | 13.9 |
| SE | 1.5 | 1.6 | 1.5 | 1.6 | 1.6 | 1.6 | 1.6 | 1.5 | 1.5 | 1.5 |
| Example | 31 | 32 | 33 | 34 | 35 | 36 | 37 | 38 | 39 | 40 |
| $Fe_2O_3$ (%) | 0.89 | 0.88 | 0.87 | 0.83 | 0.85 | 0.83 | 0.84 | 0.85 | 0.85 | 0.83 |
| FeO (%) | 0.21 | 0.21 | 0.21 | 0.20 | 0.20 | 0.20 | 0.21 | 0.20 | 0.20 | 0.22 |
| Co (ppm) | 2 | 4 | 7 | 2 | 3 | 4 | 2 | 4 | 5 | 12 |
| $V_2O_5$ (ppm) | 94 | 162 | 385 | 276 | 274 | 264 | 471 | 421 | 445 | 92 |
| TLA4 (%) | 68.47 | 67.31 | 65.49 | 69.02 | 68.35 | 67.96 | 67.92 | 68.23 | 67.20 | 65.78 |
| TE4 (%) | 42.50 | 41.90 | 41.30 | 43.80 | 43.60 | 43.60 | 42.50 | 43.80 | 42.90 | 41.30 |
| $\lambda_D$ * (nm) | 500.4 | 500.7 | 501.3 | 504.4 | 502.5 | 500.6 | 502.1 | 503.8 | 500.5 | 493.3 |
| P * (%) | 4.80 | 4.90 | 5.04 | 4.05 | 4.35 | 4.72 | 4.65 | 4.21 | 4.90 | 7.50 |

TABLE IIa-continued

| | | | | | | | | | | |
|---|---|---|---|---|---|---|---|---|---|---|
| TUV4 (%) | 15.00 | 14.00 | 12.60 | 14.10 | 14.00 | 14.30 | 14.4 | 13.60 | 14.00 | 16.70 |
| SE | 1.61 | 1.61 | 1.59 | 1.58 | 1.57 | 1.56 | 1.60 | 1.56 | 1.57 | 1.59 |

| Example | 41 | 42 | 43 | 44 | 45 | 46 | 47 | 48 | 49 | 50 |
|---|---|---|---|---|---|---|---|---|---|---|
| Fe$_2$O$_3$ (%) | 0.84 | 0.84 | 0.83 | 0.83 | 0.86 | 0.86 | 0.86 | 0.85 | 0.86 | 0.86 |
| FeO (%) | 0.22 | 0.21 | 0.20 | 0.21 | 0.21 | 0.21 | 0.23 | 0.22 | 0.21 | 0.20 |
| Co (ppm) | 12 | 12 | 21 | 22 | 14 | 14 | 11 | 87 | 16 | 13 |
| V$_2$O$_5$ (ppm) | 208 | 401 | 401 | 358 | 209 | 184 | 200 | 195 | 161 | 158 |
| TLA4 (%) | 65.39 | 64.63 | 63.26 | 62.30 | 65.00 | 65.27 | 64.86 | 47.74 | 64.33 | 65.91 |
| TE4 (%) | 41.30 | 41.50 | 41.50 | 40.70 | 41.40 | 41.90 | 40.50 | 35.00 | 41.30 | 42.60 |
| λ$_D$ * (nm) | 494.3 | 496.1 | 492.7 | 493.0 | 495.5 | 495.4 | 495.0 | 483.5 | 494.4 | 496.5 |
| P * (%) | 7.09 | 6.44 | 7.95 | 8.07 | 6.52 | 6.47 | 6.92 | 20.89 | 7.01 | 5.88 |
| TUV4 (%) | 15.70 | 13.90 | 14.70 | 13.90 | 14.70 | 14.90 | 15.10 | 14.50 | 14.70 | 14.40 |
| SE | 1.58 | 1.56 | 1.52 | 1.53 | 1.57 | 1.56 | 1.60 | 1.36 | 1.56 | 1.55 |

| Example | 51 | 52 | 53 | 54 | 55 | 56 | 57 | 58 | 59 | 60 |
|---|---|---|---|---|---|---|---|---|---|---|
| Fe$_2$O$_3$ (%) | 0.87 | 0.87 | 0.85 | 0.96 | 0.87 | 0.88 | 0.86 | 0.86 | 0.84 | 0.85 |
| FeO (%) | 0.21 | 0.23 | 0.21 | 0.22 | 0.22 | 0.22 | 0.21 | 0.21 | 0.23 | 0.22 |
| Co (ppm) | 13 | 13 | 16 | 12 | 10 | 12 | 11 | 16 | 12 | 12 |
| V$_2$O$_5$ (ppm) | 158 | 163 | 279 | 195 | 180 | 229 | 200 | 204 | 195 | 278 |
| TLA4 (%) | 65.36 | 64.08 | 64.99 | 65.05 | 65.01 | 64.42 | 65.79 | 64.18 | 64.68 | 64.52 |
| TE4 (%) | 41.70 | 39.70 | 41.70 | 41.20 | 41.20 | 40.60 | 42.00 | 41.10 | 40.40 | 40.50 |
| λ$_D$ * (nm) | 495.9 | 494.2 | 495.0 | 494.7 | 495.7 | 495.8 | 496.1 | 494.1 | 493.7 | 494.5 |
| P * (%) | 6.28 | 7.43 | 6.68 | 6.90 | 6.49 | 6.58 | 6.16 | 7.22 | 7.55 | 7.12 |
| TUV4 (%) | 14.60 | 15.00 | 14.80 | 15.20 | 14.50 | 14.00 | 14.70 | 14.60 | 15.80 | 14.90 |
| SE | 1.57 | 1.61 | 1.56 | 1.58 | 1.58 | 1.59 | 1.57 | 1.56 | 1.60 | 1.59 |

TABLE IIb

| Example | 61 | 62 | 63 | 64 | 65 | 66 | 67 |
|---|---|---|---|---|---|---|---|
| Fe$_2$O$_3$ (%) | 0.93 | 0.93 | 1.02 | 1.02 | 0.84 | 0.84 | 0.93 |
| FeO (%) | 0.23 | 0.23 | 0.25 | 0.25 | 0.21 | 0.22 | 0.23 |
| Co (ppm) | 14 | 15 | 15 | 15 | 15 | 15 | 14 |
| Cr$_2$O$_3$ (ppm) | 22 | 51 | 29 | 56 | 27 | 54 | 22 |
| TLA4 (%) | 63.77 | 63.23 | 61.58 | 61.20 | 66.04 | 65.22 | 63.77 |
| TE4 (%) | 39.40 | 39.05 | 37.00 | 36.86 | 42.27 | 41.31 | 39.40 |
| λ$_D$ * (nm) | 494.1 | 495.5 | 495.8 | 497.1 | 493.4 | 494.1 | 494.1 |
| P * (%) | 7.49 | 7.20 | 7.31 | 6.96 | 7.26 | 7.41 | 7.49 |
| TUV4 (%) | 15.25 | 14.94 | 12.64 | 12.46 | 17.52 | 17.73 | 15.25 |
| SE | 1.62 | 1.62 | 1.66 | 1.66 | 1.56 | 1.58 | 1.62 |

| Example | 68 | 69 | 70 | 71 | 72 | 73 | 74 |
|---|---|---|---|---|---|---|---|
| Fe$_2$O$_3$ (%) | 0.93 | 1.02 | 1.02 | 0.84 | 0.84 | 0.93 | 0.94 |
| FeO (%) | 0.23 | 0.25 | 0.25 | 0.21 | 0.21 | 0.23 | 0.22 |
| Co (ppm) | 15 | 15 | 15 | 15 | 15 | 46 | 45 |
| Cr$_2$O$_3$ (ppm) | 51 | 29 | 56 | 27 | 54 | 38 | 62 |
| TLA4 (%) | 63.23 | 61.58 | 61.20 | 66.04 | 65.22 | 55.71 | 55.97 |
| TE4 (%) | 39.05 | 37.00 | 36.86 | 42.27 | 41.31 | 36.51 | 37.13 |
| λ$_D$ * (nm) | 495.5 | 495.8 | 497.1 | 493.4 | 494.1 | 487.9 | 488.8 |
| P * (%) | 7.20 | 7.31 | 6.96 | 7.26 | 7.41 | 13.42 | 12.46 |
| TUV4 (%) | 14.94 | 12.64 | 12.46 | 17.52 | 17.73 | 14.85 | 14.33 |
| SE | 1.62 | 1.66 | 1.66 | 1.56 | 1.58 | 1.53 | 1.51 |

NB: *=expressed in SI at 5 mm under illuminant C.

What is claimed is:

1. A green-colored soda-lime glass composed of principle constituents-glass formers and of coloring agents, characterized in that the coloring agents consist of the following percentages by weight, the total amount of iron being expressed in the form of Fe$_2$O$_3$:

| | |
|---|---|
| Fe$_2$O$_3$ | 0.7 to 1.3% |
| FeO | 0.18 to 0.25% |
| Co | 0 to 0.0040% | and one of

| | |
|---|---|
| V$_2$O$_5$ | 0.0050 to 0.15, or |
| Cr$_2$O$_3$ | 0.0015 to 0.0250% | and optional colorants present as batch impurities, and the glass has, under illuminant A and for a glass thickness of 4 mm, a light transmission (TLA4) of between 40 and 70%, a selectivity (SE4) of greater than or equal to 1.50, an ultraviolet radiation transmission (TUV4) of less than 20%, and a dominant wavelength (L$_D$) for a glass thickness of 5 mm of greater than 490 nm.

2. The colored glass as claimed in claim 1, characterized in that it has a selectivity (SE4) of greater than or equal to 1.55.

3. The colored glass as claimed in claim 1, characterized in that it has a selectivity (SE4) of greater than or equal to 1.60.

4. The colored glass as claimed in claim 1, characterized in that it has a light transmission of greater than 50%.

5. The colored glass as claimed in claim 1, characterized in that it has a light transmission of greater than 55%.

6. The colored glass as claimed in claim 1, characterized in that it has, for a glass thickness of 5 mm, a dominant wavelength ($\lambda_D$) of less than 550 nm.

7. The colored glass as claimed in claim 1, characterized in that it has, for a glass thickness of 5 mm, a dominant wavelength ($\lambda_D$) of less than 520 nm.

8. The colored glass as claimed in claim 1, characterized in that it contains no more than three coloring agents.

9. The colored glass claimed in claim 1, characterized in that it has at least one of the following optical properties:

55%<TLA4<70%
30%<TE4<45%
6%<TUV4<20%
490 nm<$\lambda_D$<520 nm
2%<P<10%.

10. The colored glass as claimed in claim 1, characterized in that it has at least one of the following optical properties:

63%<TLA4<67%
37%<TE4<41%
11%<TUV4<18%
500 nm<$\lambda_D$<505 nm
4%<P<6%.

11. The colored glass as claimed in claim 1, characterized in that it comprises the following percentages by weight of coloring agents, the total amount of iron being expressed in the form of $Fe_2O_3$:

| | |
|---|---|
| $Fe_2O_3$ | 0.88 to 0.98% |
| FeO | 0.22 to 0.25% | and one of the following combinations:

Co 0.0003 to 0.0009% plus $V_2O_5$ 0.0200 to 0.0400%, or
Co 0.0003 to 0.0011% plus $Cr_2O_3$ 0.0020 to 0.0100%.

12. The colored glass as claimed in claim 1, characterized in that it has, for a thickness of 5 mm, a light transmission under illuminant C (TLC5) of between 50 and 70%.

13. The colored glass as claimed in claim 1, characterized in that it is coated with a layer of metal oxides.

14. The colored glass as claimed in claim 1, characterized in that it is in sheet form.

15. The colored glass as claimed in claim 1, characterized in that it forms a window for an automobile.

* * * * *